United States Patent
Miyamoto et al.

(10) Patent No.: US 6,316,580 B1
(45) Date of Patent: Nov. 13, 2001

(54) POLYCARBONATE RESIN

(75) Inventors: Masaaki Miyamoto; Kenji Tsuruhara, both of Kitakyushu (JP)

(73) Assignee: Mitsubishi Chemical Corporation, Tokyo (JP)

( * ) Notice: Subject to any disclaimer, the term of this patent is extended or adjusted under 35 U.S.C. 154(b) by 59 days.

(21) Appl. No.: 09/674,396

(22) PCT Filed: Feb. 25, 2000

(86) PCT No.: PCT/JP00/01089

§ 371 Date: Dec. 29, 2000

§ 102(e) Date: Dec. 29, 2000

(87) PCT Pub. No.: WO00/52076

PCT Pub. Date: Sep. 8, 2000

(30) Foreign Application Priority Data

Mar. 2, 1999 (JP) ................................. 11-053677

(51) Int. Cl.[7] .................................................. C08G 64/02
(52) U.S. Cl. ............................................ 528/196; 528/198
(58) Field of Search ..................................... 528/196, 198

(56) References Cited

U.S. PATENT DOCUMENTS

| 3,269,985 | 8/1966 | Loncrini . |
| 3,437,639 | 4/1969 | Beach et al. . |
| 4,286,084 | 8/1981 | Mark . |
| 4,291,151 | 9/1981 | Mark . |

FOREIGN PATENT DOCUMENTS

| 07165899 A | 6/1995 | (JP) . |
| 09194581 A | 7/1997 | (JP) . |
| 10036498 A | 2/1998 | (JP) . |
| 11292962 A | 10/1999 | (JP) . |
| WO 00/52076 | * 9/2000 | (JP) . |

OTHER PUBLICATIONS

International Search Report/International Appln. No. PCT/JP00/01089.

* cited by examiner

*Primary Examiner*—Terressa M. Boykin
(74) *Attorney, Agent, or Firm*—Dike, Bronstein, Roberts & Cushman; David G. Conlin

(57) ABSTRACT

A polycarbonate resin obtained by reacting a carbonate raw material with a dihydroxy compound, having:

a ratio (Mw/Mn) of a weight-average molecular weight (Mw) to a number-average molecular weight (Mn) of not more than 2.2:1, calculated as polystyrene, when measured by gel permeation chromatography; and a ratio (Mv/Mn') of a viscosity-average molecular weight (Mv) calculated according to the following formulae, to a number-average molecular weight (Mn') calculated based on the number of molecular ends, of not more than 1.40:1.

$$\eta_{sp}/C=[\eta]\times(1+0.28\eta_{sp})$$

$$[\eta]=1.23\times10^{-4}\times(M_v)^{0.83}$$

wherein $\eta_{sp}$ is a specific viscosity of the polycarbonate resin when measured with respect to a methylene chloride solution thereof at 20° C.; and C is a concentration of the methylene chloride solution, in the present case, the methylene chloride solution having a polycarbonate resin concentration of 0.6 g/dl is used. The above polycarbonate resin has a molecular weight distribution close to that of monodisperse system, and generates an extremely less amount of volatile components derived from oligomers, upon heat-molding thereof.

5 Claims, No Drawings

POLYCARBONATE RESIN

TECHNICAL FIELD

The present invention relates to a polycarbonate resin having a molecular weight distribution close to that of a monodisperse system. The polycarbonate resin according to the present invention exhibits an extremely narrow molecular weight distribution and, therefore, is extremely small in content of low-molecular weight oligomers, so that volatile components derived from the oligomers can be almost completely prevented from being generated upon heat-molding thereof.

BACKGROUND ART

As well known in the arts, polycarbonate resins have been extensively applied to the production of various molded products. For example, substrates for optical recording media such as optical discs or magneto-optical discs have been produced mainly by injection-molding these polycarbonate resins. In order to injection-mold such precision products, it has been required to reduce the amount of volatile oligomers which are derived from the polycarbonate resins and which are adhered to stampers or dies. However, the volatilization of the polycarbonate-derived oligomers has a close relationship to the content thereof in the polycarbonate resins. There are hitherto known no polycarbonate resins which can be considerably reduced in content of the oligomers, except for extracted products obtained by using a solvent.

Conventionally, in order to improve properties of polycarbonate resins, intense efforts have been directed to studies for developing such a method for producing polycarbonate resins having not only a small content of oligomers but also a narrow molecular weight distribution. For example, in Japanese Patent Application Laid-Open (KOKAI) No. 55-52321(1980), there has been described a method comprising reacting bisphenol A with phosgene at a low temperature to produce oligomers having a narrow molecular weight distribution, and then polymerizing the thus obtained oligomers in the presence of an end sealing agent, thereby producing a polycarbonate resin having a high molecular weight and a narrow molecular weight distribution. In Japanese Patent Application Laid-Open (KOKAI) No. 1-278528(1989), there has been described a method of producing a polycarbonate resin having a narrow molecular weight distribution by conducting a two-stage polymerization in which bisphenol A and phosgene are first reacted with each other in the presence of an end sealing agent to produce oligomers, and then bisphenol A is added to the thus obtained oligomers. In Japanese Patent Application Laid-Open (KOKAI) No. 3-109420(1991), there has been described a method comprising reacting bisphenol A with phosgene in a first pipe reactor, adding an end sealing agent to the reaction solution, and then introducing the reaction solution through a second pipe reactor into a vessel-type reactor where the reaction solution is further reacted to produce an oligomer of polycarbonate. In this KOKAI, it has been further described that the thus obtained polycarbonate oligomer is further mixed with bisphenol A and subjected to a two-stage polymerization, thereby producing a polycarbonate resin having a narrow molecular weight distribution.

In Japanese Patent Application Laid-Open (KOKAI) Nos. 6-336522(1994) and 7-165899(1995), there has been described a method of producing a polycarbonate resin having not only a small content of oligomers but also a narrow molecular weight distribution, comprising reacting bisphenol A with phosgene in the absence of an end sealing agent to obtain a prepolymer, and then adding an end sealing agent to the obtained prepolymer to conduct the interfacial polymerization thereof. In these KOKAIs, it has also been described that polycarbonate resins having a molecular weight distribution (Mw/Mn) of about 2.0 were obtained. However, the descriptions of these KOKAIs are deemed to be inconsistent with that of the above Japanese Patent Application Laid-Open (KOKAI) No. 3-109420(1991), i.e., such a description that when the addition of an end sealing agent is delayed, the molecular weight distribution of the obtained polycarbonate resin becomes broader. In fact, when the molecular weight distributions (Mw/Mn) of the polycarbonate resins obtained in these KOKAIs are calculated from glass transition temperatures thereof according to the relationship between glass transition temperature and molecular weight as described in "Eur. Polym. J.", vol. 18, pp. 563 to 567(1982), it has been recognized that the Mw/Mn values are far larger than 2 and almost close to 3. For this reason, it is suggested that the actual molecular weight distributions of the polycarbonate resins described in these KOKAIs are considerably broad when precisely measured.

These conventional methods for the production of polycarbonate resins all have aimed at reducing the content of low-molecular weight oligomers, thereby preventing volatile components derived therefrom from being generated upon heat-molding. However, any of these methods has failed to completely remove the low-molecular weight oligomers from the obtained polymer. Further, there have been proposed methods of producing relatively suitable materials by reprecipitation or extraction using a poor solvent (Japanese Patent Application Laid-Open (KOKAI) Nos. 63-278929(1988), 64-6020(1989) and 4-306227(1992)). However, these methods not only have failed to completely remove oligomers from the obtained materials, but also require additional steps for separating the solvent used from the materials, inevitably resulting in increased costs.

Also, as another method for modifying the melt-flowability of polycarbonate resins, there has been studied such a method of sealing end groups of a polycarbonate molecule with compounds having a long-chain alkyl group such as long-chain alkyl phenol or long-chain alcohol (refer to British Patent No. 965,457, U.S. Pat. No. 3,240,756, and Japanese Patent Application Laid-Open (KOKAI) Nos. 51-34992(1976) and 60-203632(1985)). Further, many condensation catalysts have been reported (refer to U.S. Pat. Nos. 3,160,606, 3,173,891, 3,184,431, 3,240,756 and 3,275, 601). Any of these prior arts has aimed at improvement in reaction rate, and requires the use of an end sealing agent in combination.

Therefore, an object of the present invention is to provide a low-volatile polycarbonate resin having an extremely narrow molecular weight distribution and containing substantially no low-molecular weight oligomers.

DISCLOSURE OF THE INVENTION

The polycarbonate resin according to the present invention is obtained by reacting a carbonate raw material with a dihydroxy compound, and exhibits a ratio (Mw/Mn) of the weight-average molecular weight (Mw) to the number-average molecular weight (Mn) of not more than 2.2:1 (calculated as polystyrene) when measured by gel permeation chromatography, and a ratio (Mv/Mn') of the viscos ityaverage molecular weight (Mv) calculated from the following formulae, to the number-average molecular weight (Mn') calculated from the number of molecular ends, of not more than 1.40:1.

$$\eta_{sp}/C=[\eta]\times(1+0.28\eta_{sp})$$

$$[\eta]=1.23\times10^{-4}\times(M_v)_{0.83}$$

wherein $\eta_{sp}$ is a specific viscosity of the polycarbonate resin when measured with respect to a methylene chloride solution thereof at 20° C.; and C is a concentration of the methylene chloride solution; in the present case, the methylene chloride solution having a polycarbonate concentration of 0.6 g/dl is used.

The polycarbonate resin according to the present invention has preferably a Mw/Mn ratio of not more than 2.0:1 and a Mv/Mn' ratio of not more than 1.30:1, more preferably a Mw/Mn ratio of not more than 1.8:1 and a Mv/Mn' ratio of not more than 1.20:1.

The polycarbonate resin of the present invention is produced by reacting a carbonate raw material with a dihydroxy compound.

As the carbonate raw materials, there may be exemplified compounds capable of forming carbonate bonds represented by the formula:

—O—C (=O)—O—, in a main chain of the polycarbonate by polymerization reaction such as condensation reaction or exchange reaction, for example, phosgene and carbonic acid diesters. As the carbonic acid diesters, there may be exemplified dimethyl carbonate, diethyl carbonate, diphenyl carbonate, ditolyl carbonate or the like.

As the dihydroxy compounds, there may be exemplified aliphatic dihydroxy compounds, aromatic dihydroxy compounds or the like. Examples of the aromatic dihydroxy compounds may include aromatic compounds having two phenolic hydroxyl groups.

Thus, the polycarbonate resin according to the present invention can be produced, for example, by reacting the aromatic compound having two phenolic hydroxyl groups such as typically bisphenol A, with phosgene to obtain an oligomer, and then polymerizing the thus obtained oligomer in the absence of an end sealing agent but in the presence of a catalyst such as pyridine hydrochloride or quinoline hydrochloride.

The above process for the production of the polycarbonate resin is described in more detail below. As the aromatic compounds having two phenolic hydroxyl groups, there may be used those conventionally known as raw materials of polycarbonate resins, for example, those compounds described in specifications of U.S. Pat. Nos. 4,982,014, 3,028,365, 2,999,835, 3,148,172, 3,275,601, 2,991,273, 3,271,367, 3,062,781, 2,970,131 and 2,999,846, German Patents Nos. 1,570,703, 2,063,050, 2,063,052 and 2,211, 956, and French Patent No. 1,561,518.

Examples of the aromatic compounds having two phenolic hydroxyl groups may include hydroquinone, resorcin, dihydroxy diphenol, bis(hydroxyphenyl)alkanes, bis (hydroxyphenyl)cycloalkanes, bis(hydroxyphenyl)sulfide, bis(hydroxyphenyl)ethers, bis(hydroxyphenyl)ketones, bis (hydroxyphenyl)sulfone, bis(hydroxyphenyl)sulfoxide, bis (hydroxyphenyl)dialkylbenzenes, or derivatives thereof having alkyl or halogen substituents bonded to an aromatic ring thereof. Among these aromatic compounds having two phenolic hydroxyl groups, the preferred compounds are 2,2-bis(4-hydroxyphenyl)propane, 2,2-bis(3,5-dimethyl-4-hydroxyphenyl)propane, 1,1-bis(4-hydroxyphenyl) cyclohexane and 1,1-bis(4-hydroxyphenyl)-3,3,5-trimethyl cyclohexane.

Meanwhile, the aromatic compounds having two phenolic hydroxyl groups may be used in combination with a small amount of a branching agent having three or more functional groups. Such branching agents are known in the arts, and examples of the branching agents may include 2,4-bis(4'-hydroxyphenyl-isopropyl)phenol, 2,6-bis(2'-hydroxy-5'-methylbenzyl)-4-methyl phenol, 2-(4-hydroxyphenyl)-2-(2, 4-dihydroxyphenyl)propane, 1,4-bis(4,4'-dihydroxytriphenylmethyl)benzene, 2,4-dihydroxy benzoic acid, trimesic acid, cyanuric chloride, bis(4'-hydroxyphenyl)-2oxo-2, 3-dihydroxyindole, 3,3-bis(4-hydroxy-3-methylphenyl)2-oxo-2,3-dihydroindole or the like. Among these branching agents, those having three or more phenolic hydroxyl groups are preferred. The amount of the branching agent used varies depending upon the aimed degree of branching, and is usually 0.05 to 2 mol% based on the aromatic compound having two phenolic hydroxyl groups. When the branching agent is used in combination, care should be taken since the viscosity-average molecular weight (Mv) of polycarbonate tends to be increased.

In order to obtain a polycarbonate resin having a molecular weight distribution close to that of monodisperse system, the hydrochloride used as a catalyst therefor is required to exhibit a pKa value of not more than 7, preferably not more than 6, more preferably not more than 5.5. More specifically, by using the catalyst having a lower basicity, the chloroformate molecular end can be inhibited from being ionized, so that the nucleophilic substitution reaction can be preferentially initiated only from the other ionized molecule end (phenylene-ONa molecular end). Thus, the reaction mechanism for the production of the polycarbonate resin according to the present invention is quite different from that of polycondensation upon the production of conventional polycarbonate resins where only a single reaction proceeds, so that it is possible to obtain a polycarbonate having a molecular weight distribution corresponding to Poisson's distribution. Further, as described hereinafter, it is preferred that the polycarbonate resin according to the present invention be produced by an interfacial polymerization reaction in which both a water phase and an organic phase are allowed to coexist. In the interfacial polymerization, the nucleophilic substitution reaction proceeds only from ionized molecular ends. Therefore, the interfacial polymerization reaction is necessarily conducted in the form of a successive reaction where such a molecular growth corresponding to the interface area per unit volume can be merely reached. As a result, the larger the interface area becomes, the higher the molecular weight can be reached. At the time at which condensable species are eliminated, the chlorofomate molecular ends are hydrolyzed with NaOH in the water phase and converted into OH end groups, so that the increase in molecular weight is stopped. In the case where the interface area per unit volume is small, the chloroformate molecular ends immediately undergo a hydrolysis reaction as a side reaction relative to the molecular growth reaction, i.e., are hydrolyzed with NaOH in the water phase. As a result, there is reached such a condition that no further molecular growth proceeds, namely, the molecular weight is governed by the interface area. Such a reaction mechanism is due to the fact that the growth reaction proceeds at a much higher rate as compared to that of the hydrolysis reaction.

In the conventional polycondensation reaction for the production of ordinary polycarbonate resins, the above-described reaction unbalance has been not caused.

Specifically, in the conventional polycondensation, since a catalyst having a high pKa value is used, the chloroformate molecular ends are activated into an ion-like state by the catalytic effect of the catalyst having a high pKa value, so that the opposite molecular ends are identical in reaction activity because the chloroformate molecular ends can be ionized to such an extent compatible with the ionized phenylene-ONa molecular ends. As a result, there is obtained a condensation product having an ordinary molecular weight distribution according to Flory's Most Probable Distribution. However, in this case, if no end sealing agent is present, the condensation product becomes an ultrahigh-molecular-weight polymer.

As the catalysts satisfying the above requirements, there may be used salts of nitrogen-containing heterocyclic compounds. Examples of the salts of nitrogen-containing heterocyclic compounds may include salts of compounds having an unsaturated nitrogen-containing 6-membered ring whose carbon atoms may have substituents, e.g., alkyl, alkoxy, halogen atom or the like, such as pyridine, quinoline, isoquinoline, picoline, acridine, pyrazine, pyridazine, pyrimidine, 2,4,6-trimethyl triazine or the like. Also, there may be used salts of compounds having an unsaturated nitrogen-containing 5-membered ring such as phenothiazine, 2-methyl imidazole, benzoimidazole, benzotriazole, benzothiazole or the like. Among these nitrogen-containing heterocyclic compounds, the use of pyridine, quinoline, picoline, imidazoles, pyrazoles and triazoles is preferred. These catalysts may be used in am amount of usually 0.01 to 1 mol %, preferably 0.05 to 0.5 mol %, more preferably 0.05 to 0.15 mol % based on the aromatic compound having two phenolic hydroxyl groups as the raw material. The nitrogencontaining heterocyclic compounds may be used in the form of salts thereof such as hydrochlorides, sulfates, nitrates or hydrobromides. It is considered that in the reaction system, these salts are kept in dissociation equilibrium between free bases and salts.

These catalysts may be present in the reaction system from the initial stage of the reaction between the aromatic compound having two phenolic hydroxyl groups and phosgene. Alternatively, these catalysts may be added to the reaction system after the reaction between the aromatic compound having two phenolic hydroxyl groups and phosgene. However, when the addition of the catalyst is too late, it become difficult to properly control the molecular weight of the obtained polycarbonate resin.

Therefore, it is preferred that the catalyst be added to the reaction system between the initial stage of the reaction with phosgene and the time at which the molecular weight of the polymer starts to be increased, i.e., up to the time at which the viscosity-average molecular weight (Mv) of the polymer reaches 2,000 to 3,000.

Also, the above catalyst may be used in combination with the other known condensation catalysts used in two-phase interfacial polymerization method. Examples of the condensation catalysts usable in combination may include trialkyl amines, N-ethyl pyrrolidone, N-ethyl piperidine, N-ethyl morpholine, N-isopropyl piperidine, N-isopropyl morpholine or the like. Among these condensation catalysts, the use of triethyl amine and N-ethyl piperidine is preferred. The condensation catalyst may be preferably added to the reaction system after supplying phosgene thereto.

In the reaction, an aqueous solution prepared by dissolving the aromatic compound having two phenolic hydroxyl groups and sodium hydroxide in water, is mixed with an inert organic solvent to obtain an emulsion, and then phosgene is supplied to and reacted with the thus obtained emulsion to produce an oligomer. The molar ratio of the aromatic compound having two phenolic hydroxyl groups to sodium hydroxide in the aqueous solution is usually 1:1.8 to 1:3.5, preferably 1:2.0 to 1:3.2. It is preferred that a small amount of a reducing agent such as hydrosulfite be added to the aqueous solution. The ratio of the organic phase to the water phase is preferably 0.2:1 to 1.0:1 (by volume). As the inert organic solvents, there may be used those solvents which are capable of dissolving therein phosgene as the raw material as well as oligomer and polycarbonate resin produced by the reaction, and insoluble in water. The inert organic solvent may be used in an amount sufficient to dissolve the produced oligomer therein, usually in such an amount that the concentration of the oligomer solution produced is in the range of 10 to 40% by weight.

As the typical inert organic solvents, there may be exemplified aliphatic hydrocarbons such as hexane and n-heptane; chlorinated aliphatic hydrocarbons such as methylene chloride, chloroform, carbon tetrachloride, dichloroethane, trichloroethane, tetrachloroethane, dichloropropane and 1,2-dichloroethylene; aromatic hydrocarbons such as benzene, toluene and xylene; chlorinated aromatic hydrocarbons such as chlorobenzene, o-dichlorobenzene and chlorotoluene; substituted aromatic hydrocarbons such as nitrobenzene and acetophenone; or the like. Among these inert organic solvents, the use of chlorinated hydrocarbons, e.g., methylene chloride or chlorobenzene is preferred.

These inert organic solvents may be used singly or in the form of a mixture of any two or more thereof.

The reaction for the production of the oligomer may be conducted at a temperature of usually not more than 80° C., preferably not more than 70° C. When the reaction temperature is too high, undesired side reactions are caused, thereby adversely affecting the unit of phosgene. On the contrary, when the reaction temperature becomes low, the reaction can be well-controlled. However, since the reaction is considerably exothermic, the lower the reaction temperature, the higher the cost required for maintaining the low reaction temperature. Accordingly, in view of these points, the reaction is usually conducted at a temperature of 10 to 65° C.

The thus produced oligomer is then polymerized to form a polycarbonate resin. Usually, the reaction solution obtained in the above oligomer production reaction is separated into a water phase and an organic phase in which the oligomer is dissolved. The organic phase may be mixed with an additional amount of the inert organic solvent, if required, such that the oligomer concentration of the organic phase is 5 to 30% by weight. Then, after the oligomer solution is mixed with a sodium hydroxide aqueous solution and then with the above catalyst, the resultant mixture is subjected to interfacial polymerization. In this case, the ratio of the water phase to the organic phase is preferably in the range of 0.2:1 to 2.0:1 (by volume). The temperature of the interfacial polymerization reaction varies depending upon the organic solvent used, and is usually 10 to 35° C. when methylene chloride is used as the organic solvent.

After completion of the polymerization, the organic phase is washed with a sodium hydroxide aqueous solution until the content of chloroformate groups in the obtained polycarbonate resin is decreased to not more than 0.1 μeq/g, and further washed with an aqueous acid solution to neutralize alkali contained in the organic phase and remove the catalyst therefrom. The thus-treated organic phase is then washed with water to completely remove electrolytes therefrom. Finally, the organic solvent is evaporated and removed from the organic phase, thereby producing a polycarbonate resin. The thus produced polycarbonate resin usually has a viscosity-average molecular weight (Mv) of about 8,000 to about 100,000. When the viscosity-average molecular weight is too low, the obtained polycarbonate resin is deteriorated in impact resistance. When the viscosity-average molecular weight is too high, the obtained polycarbonate resin is deteriorated in melt-flowability. The viscosity-average molecular weight of the polycarbonate resin is preferably 10,000 to 70,000, more preferably 12,000 to 50,000. The polycarbonate resin produced by the interfacial polymerization reaction can exhibit an extremely narrow molecular weight distribution and a low volatilizing property without any post-treatments for controlling a molecular weight distribution thereof, such as fractional precipitation or removal of low molecular weight components by extraction.

Since no end sealing agent is used at any stage of the oligomer production reaction and the polymerization reaction for producing the polycarbonate resin from the oligomer, the end groups of the thus obtained polycarbonate resin are hydroxyl groups. When it is intended to obtain polycarbonate resins which molecular ends are sealed with log-chain alkyl groups or the like, the above obtained polycarbonate resin is further reacted with long-chain alcohols, long-chain carboxylic acids or reactive derivatives thereof, thereby producing a polycarbonate resin having molecular ends which are sealed as desired.

The polycarbonate resin according to the present invention can be produced by the above-described method, and exhibits a ratio (Mw/Mn) of the weight-average molecular weight (Mw) to the number-average molecular weight (Mn) of not more than 2.2:1 (calculated as polystyrene) when measured by gel permeation chromatography, and a ratio (Mv/Mn') of the viscosity-average molecular weight (Mv) calculated according to the following formulae, to the number-average molecular weight (Mn') calculated from the number of molecular ends, of not more than 1.40:1.

$$\eta_{sp}/C=[\eta]\times(1+0.28\eta_{sp})$$

$$[\eta]=1.23\times10^{-4}\times(M_v)^{0.83}$$

wherein $\eta_{sp}$ is a specific viscosity of the polycarbonate resin when measured with respect to a methylene chloride solution thereof at 20° C.; and C is a concentration of the methylene chloride solution; in the present case, the methylene chloride solution having a polycarbonate resin concentration of 0.6 g/dl is used.

The polycarbonate resin according to the present invention has a Mw/Mn ratio of preferably not more than 2.0:1, more preferably not more than 1.8:1, and a Mv/Mn' ratio of preferably not more than 1.30:1, more preferably not more than 1.20:1. Both of the Mw/Mn and Mv/Mn' ratios are indices showing a width of the molecular weight distribution, namely, it is meant that the smaller the respective ratios, the narrower the molecular weight distribution. As described above, there have been conventionally proposed many processes for producing polycarbonate resins having a narrow molecular weight distribution. However, the polycarbonate resin according to the present invention can exhibit a remarkably narrower molecular weight distribution than those produced by the conventional processes. As a result, the polycarbonate resin according to the present invention is free from oligomers volatilized upon melt-molding and, therefore, can exhibit excellent properties based on the low sublimation property upon melt-molding.

The polycarbonate resin of the present invention produced by the above process is remarkably different in properties from those produced by the conventional processes. This is because the nitrogen-containing compound such as pyridine hydrochloride or the like is used as the catalyst (for interfacial polycondensation) and no end sealing agent is used, upon the production of the polycarbonate resin according to the present invention. As the conventional methods for the production of polycarbonate resins, there is known the solution polymerization method using pyridine as a solvent (refer to specifications of U.S. Pat. Nos. 3,275,601, 3,269,985, 3,437,639, 3,804,722 and 3,428,600). In the solution polymerization methods, heterocyclic compounds such as pyridine or the like are used as a solvent in order to dissolve a bisphenol as a raw material and trap hydrochloric acid generated by the reaction therein. However, such an effect of activating only either one of molecular ends upon polycondensation cannot be obtained, and the obtained polycarbonate resins merely have a broader molecular weight distribution than the most-probable distribution. Subsequent to the solution polymerization method or technique, the interfacial polymerization method has been mainly used for producing polycarbonate resins. In the conventional interfacial polymerization methods for the production of polycarbonate resins, triethyl amine has been ordinarily used as the catalyst. However, when the oligomers are polymerized in the presence of only the triethyl amine catalyst and no end sealing agent is used, the polymerization reaction excessively proceeds, thereby producing gel-like polycarbonate resins having an ultra-high-molecular weight. Thus, in the conventional methods for the production of polycarbonate resins, it has been inevitably required to use the end sealing agent. However, when the polymerization is conducted in the presence of the end sealing agent, the molecules whose ends have been sealed cannot be grown, resulting in uneven molecular growth. Therefore, the molecular weight distribution of the obtained polycarbonate resins becomes considerably broad. On the other hand, when the nitrogen-containing heterocyclic compound such as pyridine hydrochloride or the like is used as the catalyst, the reaction can be well-controlled even though no end sealing agent is present in the reaction system. Further, since the molecular ends remain unsealed, the molecular growth can be uniformly performed, so that the molecular weight distribution of the obtained polycarbonate resins necessarily becomes narrow. Meanwhile, in the above process for producing the polycarbonate resin of the present invention, the Mw/Mn and Mv/Mn' ratios can be appropriately controlled, for example, by controlling the amount of the pyridine hydrochloride catalyst used and the interface area upon interfacial polycondensation which strongly influence the molecular weight of the obtained polycarbonate resin.

The polycarbonate resin of the present invention may be processed into various molded products by injection-molding method or extrusion-molding method similarly to the conventional polycarbonate resins. As the molded products, there may be exemplified raw materials of films, threads or plates, parts for lighting equipment or optical equipment, substrates for optical discs or magneto-optical discs, or the like. Upon the production of these molded products, the polycarbonate resin may be blended with various additives such as stabilizers, mold-release agents, flame retardants, anti-static agents, fillers, fibers, impact strength-modifying agents or the like, by ordinary methods.

In accordance with the present invention, there is provided a polycarbonate resin having a molecular weight distribution close to that of monodisperse system. Especially, since the polycarbonate resin of the present invention has an extremely narrow molecular weight distribution, the content of the low-molecular weight oligomers can be extremely reduced, and volatile components due to the oligomers are completely eliminated, thereby providing an industrially useful polycarbonate resin.

BEST MODE FOR CARRYING OUT THE INVENTION

The present invention will be described in more detail by reference to the following examples, but these examples are not intended to limit the scope of the present invention thereto.

In the following examples, the gel permeation chromatography, quantitative determination of end groups and evaluation of melt-flowability were conducted by the following methods.

(1) Gel Permeation Chromatography:

Apparatus used: HLC-8020 manufactured by Toso Co., Ltd.

Columns: Four columns (each having a diameter of 7.8 mm$\phi$ and a length of 300 mm) were packed with TSK 5000HLX, 4000HLX, 3000HLX and 2000HLX (all produced by Toso Co., Ltd.), respectively, and connected with each other.

Detector: Refractometer

Eluent: Tetrahydrofuran

Calibration curve: Prepared by using standard polystyrenes produced by Chemco Co., Ltd. (Molecular weights: 761 (Mw/Mn≦1.14); 2,000 (Mw/Mn≦1.20); 4,000 (Mw/Mn≦1.06); 9,000 (Mw/Mn≦1.04); 17,500 (Mw/Mn≦1.03); 50,000 (Mw/Mn≦1.03); 233,000 (Mw/Mn≦1.05); 600,000 (Mw/Mn≦1.05); and 900,000 (Mw/Mn≦1.05)).

Operation: From the chart prepared by detecting the difference between refractive indices, the molecular weights Mw and Mn (calculated as polystyrene) were measured to calculate the Mw/Mn ratio. In this case, the base line was prepared by faithfully extending a base prior to the rise of high-molecular weight under such a condition that the apparatus was kept completely stable, and connecting the base with a position where the extension was returned to an original base line of the low-molecular weight side. Meanwhile, from the measurement of the above standard polystyrenes, it was confirmed that all of the polystyrenes met standard requirements.

(2) Quantitative Determination of End Groups:

End groups of a polycarbonate resin produced without using an end sealing agent, and residual end groups unstopped when the end stopping agent is used, all were OH groups. These OH end groups were colored with titanium tetrachloride under an acid condition of acetic acid, and subjected to quantitative determination by measuring an absorbance thereof at 480 nm.

The number-average molecular weight (Mn') was calculated according to the following formula:

Mn'=10$^6$/(number of end groups ($\mu$eq/g)×½)

Assuming that a whole amount of an end sealing agent used upon the polymerization is bonded to molecular ends, the total number of end groups was determined as a sum of the number of OH end groups measured by the above method and the number of sealed end groups calculated from the amount of the end sealing agent added. Meanwhile, in the preliminary test, the polycarbonate resin was polymerized in the presence of the end sealing agent, and hydrolyzed with alkali to determine the amount of the end sealing agent bonded thereto. As a result, it was confirmed that a whole amount of the end sealing agent used was bonded to the molecular ends of the polycarbonate resin.

(3) Melt-Flowability:

Using a flow tester ("CFT-500" manufactured by Shimadzu Seisakusho Co., Ltd.), the amount of resin fallen through an orifice having a diameter of 1 mm and a length of 10 mm for a predetermined period of time was measured. In the case where the viscosity-average molecular weight (Mv) was not more than 16,000, the measurement was conducted at a temperature of 280° C. under a load of 80 kg/cm$^2$G. In the case where the viscosity-average molecular weight (Mv) was more than 16,000, the measurement was conducted at a temperature of 280° C. under a load of 160 kg/cm$^2$G.

(4) Measurement of Decomposed and Volatile Components:

20 g of the obtained polycarbonate pellets were sealed in a glass tube under vacuum (1 mmHg). Only the pellet-filled portion of the glass tube was heated at 350° C. for 20 minutes. A whole amount of components adhered to a gas phase portion of the glass tube when air-cooled (150° C. to 50° C.) were dissolved in tetrahydrofuran (THF).

The obtained solution was measured by liquid chromatography (LC) (measuring conditions: the concentration of a solvent used was varied with a gradient of from THF/water (1/1) up to 100% THF; detector: UV 270 nm; kind of measuring device: Shimadzu LC-9A manufactured by Shimadzu Seisakusho Co., Ltd.).

The compounds developed by the liquid chromatography were respectively identified by liquid chromatography/mass spectrometry (LC-MS) method.

Among the thus identified compounds, a highly-sublimable mono-unit oligomer (PBP represented by the following formula) and PB (represented by the following formula) having only one molecular end stopped, both of which being linear oligomers sandwiching bisphenol A (BPA), and C-PTBP (represented by the following formula) formed by end stopping agents condensed to each other, were compared with respect to contents thereof. The degree of influence of the respective oligomers varied depending upon the molding temperature. All of the oligomers had a sublimation property and contaminated dies or stampers.

<PBP>
  tBuPhO-C(=O)—O-BPA-O—C(=O)-OPhtBu
<PB>
  tBuPhO-C(=O)—O-BPA-OH
<C-PTBP>
  tBuPhO-C(=O)-OPhtBu

In the case where phenol was used as an end stopping agent, compounds such as diphenyl carbonate (DPC) and phenyl-terminated PB and PBP were produced as the oligomers. It has been recognized that these compounds also exhibited a sublimation property and were adhered to dies or stampers upon molding, thereby adversely affecting the product quality.

<DPC>
  PhO-C(=O)—OPh

In the above-described formulae, "Pho-" represents phenol residue, "tBuPhO-" represents t-butyl phenol residue and "O-BPA-O" represents bisphenol A residue.

EXAMPLES 1 to 5:

Bisphenol A was dissolved in an aqueous sodium hydroxide solution containing hydrosulfite, at 35° C. and cooled to 25° C. The obtained aqueous solution was continuously supplied together with methylene chloride cooled to 5° C. into a stainless steel pipe having an inner diameter of 6 mm, and mixed together. The obtained mixed solution was passed through a homomixer ("T.K. Homomic Line Flow LF-500 type" manufactured by Tokushu Kika Co., Ltd.) and emulsified to prepare an emulsion. The flow rates of bisphenol A, sodium hydroxide, water, hydrosulfite and methylene chloride supplied into the pipe were 16.31 kg/hr, 5.93 kg/hr, 101.1 kg/hr, 0.018 kg/hr and 68.0 kg/hr,. respectively.

The thus obtained emulsion was passed through the pipe having an inner diameter of 6 mm, and then introduced into a Teflon pipe reactor having an inner diameter of 6 mm and a length of 34 m. At the same time, liquefied phosgene cooled to 0° C. was supplied into the pipe reactor at a flow rate of 7.5 kg/hr and reacted with the emulsion, thereby producing oligomers. The contents of the pipe reactor were flowed at a rate of 1.7 m/sec. The liquefied phosgene used was preliminarily purified by passing phosgene cooled to −5° C. through an activated carbon-filled cylindrical container having a diameter of 55 mm and a height of 500 mm, at a space velocity (SV) of 3.

<Activated carbon>

Tradename: YASHICOAL S (produced by Taihei Kagaku Co., Ltd.);

True density: 2.1 g/ml;

Porosity: 40%;

Specific surface area: 1,200 m$^2$/g;

Pore volume: 0.86 ml/g.

Meanwhile, although the temperature of the pipe reactor was increased up to 60° C., an outlet of the reactor was controlled to 35° C. by external cooling. The reaction mixture was allowed to stand so as to separate into a water phase and an oil phase.

23 kg of the obtained oil phase was taken out and charged into a 70-liter reaction vessel equipped with Pfaudler blades. Then, 10 kg of methylene chloride, 2.2 kg of a 25% sodium hydroxide aqueous solution, 6 kg of water, the catalyst as shown in Table 1 and 2.2 g of triethyl amine were charged into the reaction vessel, and the contents of the reaction vessel were stirred at 30° C. for 30 minutes in a nitrogen atmosphere to conduct polymerization reaction, thereby producing a polycarbonate resin.

To the obtained reaction mixture were added 30 kg of methylene chloride and 7 kg of water. After stirring at room temperature for 20 minutes, the resultant mixture was allowed to stand so as to separate into a water phase and an organic phase. The obtained organic phase was mixed with 20 kg of 0.1N hydrochloric acid, and the mixture was stirred for 15 minutes and then allowed to stand so as to separate into a water phase and an organic phase. The thus obtained organic phase was further mixed with 20 kg of pure water, and the resultant mixture was stirred for 15 minutes and then allowed to stand so as to separate into a water phase and an oil phase. After the washing procedure thus repeated three times, no chlorine ions were detected in the water phase, whereupon the washing procedure was stopped. The methylene chloride was evaporated and removed from the organic phase using a kneader, thereby obtaining a powder. The obtained powder was dried to obtain a polycarbonate resin. The polymerization conditions and properties of the obtained polycarbonate resin are shown in Table 1.

COMPARITIVE EXAMPLES 1 to 3

The same procedure as defined in Example 1 was conducted except that an end stopping agent was present and the nitrogen-containing heterocyclic compound as catalyst was not used upon the production of oligomer from bisphenol A and phosgene, thereby obtaining a polycarbonate resin. The polymerization conditions and properties of the obtained polycarbonate resin are shown in Table 1.

COMPARATIVE EXAMPLES 4 to 7

The same procedure as defined in Example 1 was conducted except that an end stopping agent was present upon the production of oligomer from bisphenol A (BPA) and phosgene, thereby obtaining a polycarbonate resin. The polymerization conditions and properties of the obtained polycarbonate resin are shown in Table 1.

COMPARATIVE EXAMPLE 8 (FOLLOW-UP TEST OF EXAMPLE 4 of U.S. Pat. No. 3,269, 985)

While stirring a mixture of 50 ml of pyridine and 2 ml of water in a one-liter flask, a mixed solution composed of 200 ml of chlorobenzene in which 35.3 g of a bisphenol A-bischloroformate oligomer (Mv: 2,000) was dissolved, and 50 ml of pyridine, was dropped thereinto.

In the above reaction, the obtained mixture was slightly heated (at 40° C.) in order to promote the dissolution of bischloroformate, and then cooled to room temperature. The reaction product was precipitated with isopropyl alcohol, filtered and then dried.

The thus obtained polycarbonate had a molecular weight (Mv) of 9,200 and a Mw/Mn ratio of 2.35:1.

COMPARATIVE EXAMPLE 9 (FOLLOW-UP TEST OF EXAMPLE 5 of U.S. Pat. No. 3,437, 639)

A mixed solution of 22.8 g of BPA, 40 ml of dried pyridine and 100 ml of dried THF was stirred, and the temperature thereof was set to 25 to 30° C. within a water bath. 10.0 g of phosgene was added to the mixed solution for 15 minutes. While stirring the obtained mixture, 0.5 g of phosgene was added thereto for 5 minutes. Thereafter, the resultant mixture was diluted with THF, and then a hydrochloric acid gas was passed through the diluted solution. The obtained solution was slowly added to acetone while stirring, thereby precipitating a polymer.

The thus obtained polycarbonate had a molecular weight (Mv) of 10,800 and a Mw/Mn ratio of 2.59:1.

Both of the above-described Comparative Examples are directed to solution polymerization using pyridine as a solvent. As is apparent from these Comparative Examples, polycarbonate having a sharp molecular weight distribution could not be produced only by using pyridine. Only when such a catalyst is used in the interfacial polycondensation to cause a large difference in reactivity between molecular ends thereof and any end stopping agent is not present in such a reaction, it becomes possible to produce the aimed polycarbonate resin. As shown in Comparative Examples 8 and 9, the polycarbonate resins produced by the conventional methods exhibit a broader molecular weight distribution.

TABLE 1

|  | Example 1 | Example 2 | Example 3 |
| --- | --- | --- | --- |
| Kind of catalyst used | Pyridine hydrochloride | Pyridine hydrochloride | Pyridine hydrochloride |
| Kind of end stopping agent used | — | — | — |
| Amount of catalyst used (mol % based on bisphenol) | 0.080 | 0.107 | 0.111 |

TABLE 1-continued

| | Example 1 | Example 2 | Example 3 |
|---|---|---|---|
| Amount of end stopping agent used (mol % based on bisphenol) | — | — | — |
| Viscosity-average molecular weight (Mv) | 25,300 | 18,200 | 8,300 |
| Molecular weight distribution (Mw/Mn from GPC) | 1.53 | 1.54 | 1.52 |
| Number-average molecular weight (Mn' from number of end groups) | 23,000 | 15,200 | 7,800 |
| Mv/Mn' (from number of end groups) | 1.10 | 1.19 | 1.22 |
| Q value (ml/sec) ($\times 10^{-2}$) | 3.1 | 16.0 | 48.0 |
| Number of OH end groups ($\mu$eq/g) | 87 | 131 | 294 |
| Amount of sublimation on heating — Amount of C-PTBP sublimated (ppm) | Not detected | Not detected | Not detected |
| Amount of sublimation on heating — Amount of PB sublimated (ppm) | Not detected | Not detected | Not detected |
| Amount of sublimation on heating — Amount of PBP sublimated (ppm) | Not detected | Not detected | Not detected |

| | Example 4 | Example 5 | Comparative Example 1 |
|---|---|---|---|
| Kind of catalyst used | Quinoline hydrochloride | Quinoline hydrochloride | — |
| Kind of end stopping agent used | — | — | p-t-butyl phenol |
| Amount of catalyst used (mol % based on bisphenol) | 0.080 | 0.090 | — |
| Amount of end stopping agent used (mol % based on bisphenol) | — | — | 6.02 |
| Viscosity-average molecular weight (Mv) | 26,300 | 20,000 | 13,800 |
| Molecular weight distribution (Mw/Mn from GPC) | 1.70 | 1.72 | 2.75 |
| Number-average molecular weight (Mn' from number of end groups) | 23,900 | 16,900 | 8438 |
| Mv/Mn' (from number of end groups) | 1.10 | 1.18 | 1.70 |
| Q value (ml/sec) ($\times 10^{-2}$) | 2.5 | 9.6 | 20.2 |
| Number of OH end groups ($\mu$eq/g) | 84 | 118 | 10 |
| Amount of sublimation on heating — Amount of C-PTBP sublimated (ppm) | Not detected | Not detected | 0.6 |
| Amount of sublimation on heating — Amount of PB sublimated (ppm) | Not detected | Not detected | 4.2 |
| Amount of sublimation on heating — Amount of PBP sublimated (ppm) | Not detected | Not detected | 9.8 |

| | Comparative Example 2 | Comparative Example 3 | Comparative Example 4 |
|---|---|---|---|
| Kind of catalyst used | — | — | Pyridine hydrochloride |
| Kind of end stopping agent used | p-t-butyl phenol | p-t-butyl phenol | p-t-butyl phenol |
| Amount of catalyst used (mol % based on bisphenol) | — | — | 0.080 |
| Amount of end stopping agent used (mol % based on bisphenol) | 3.50 | 2.24 | 2.24 |
| Viscosity-average molecular weight (Mv) | 20,800 | 30,300 | 29,500 |
| Molecular weight distribution (Mw/Mn from GPC) | 2.84 | 3.18 | 3.15 |
| Number-average molecular weight (Mn' from number of end groups) | 14,514 | 22,678 | 19,700 |
| Mv/Mn' (from number of end groups) | 1.54 | 1.48 | 1.50 |
| Q value (ml/sec) ($\times 10^{-2}$) | 7.7 | 1.1 | 1.3 |
| Number of OH end groups ($\mu$eq/g) | 8 | 9 | 12 |
| Amount of sublimation on heating — Amount of C-PTBP sublimated (ppm) | 0.3 | 0.2 | 0.2 |
| Amount of sublimation on heating — Amount of PB sublimated (ppm) | 2.4 | 1.6 | 1.7 |
| Amount of sublimation on heating — Amount of PBP sublimated (ppm) | 5.7 | 3.6 | 4.1 |

| | Comparative Example 5 | Comparative Example 6 | Comparative Example 7 |
|---|---|---|---|
| Kind of catalyst used | Quinoline hydrochloride | Pyridine hydrochloride | Pyridine hydrochloride |
| Kind of end stopping agent used | p-t-butyl phenol | Phenyl chloroformate | Phenyl chloroformate |
| Amount of catalyst used (mol % based on bisphenol) | 0.080 | 0.080 | 0.080 |
| Amount of end stopping agent used (mol % based on bisphenol) | 2.24 | 2.24 | 6.00 |
| Viscosity-average molecular weight (Mv) | 30,000 | 28,900 | 14,200 |
| Molecular weight distribution (Mw/Mn from GPC) | 3.16 | 2.97 | 2.65 |
| Number-average molecular weight (Mn' from number of end groups) | 19,400 | 20,070 | 8,600 |
| Mv/Mn' (from number of end groups) | 1.55 | 1.44 | 1.65 |
| Q value (ml/sec) ($\times 10^{-2}$) | 1.2 | 1.5 | 18.2 |
| Number of OH end groups ($\mu$eq/g) | 10 | 11 | 7 |
| Amount of sublimation on heating — Amount of C-PTBP sublimated (ppm) | 0.1 | 0.2 | 0.6 |
| Amount of sublimation on heating — Amount of PB sublimated (ppm) | 1.8 | 1.6 | 4.3 |
| Amount of sublimation on heating — Amount of PBP sublimated (ppm) | 4.0 | 3.8 | 9.9 |

TABLE 1-continued

| PBP sublimated (ppm) |
| --- |

EXAMPLES 6 to 9 (EXAMPLES INDICATING THE DEPENDENCY OF MOLECULAR WEIGHT ON STIRRING-ROTATION SPEED IN THE CASE WHERE TRIETHYL AMINE DID NOT COEXIST 28 kg of a methylene chloride solution of the oligomer produced by the same method as defined in each of Examples 1 to 5, was charged into a 200-liter reaction vessel (equipped with four paddles/two-stage and baffle), and 17 kg of methylene chloride was further added to dilute the solution. After controlling the temperature of the obtained solution to 10° C., 1.33 g of pyridine hydrochloride was added thereto, and the resultant mixture was stirred by adjusting the stirring-rotation speed to those shown in Table 2. Successively, a mixed solution composed of 5.42 kg of a 25% NaOH solution and 30.7 kg of pure water whose temperature was adjusted to 10° C., was added to the mixture, and the obtained mixture was stirred for 60 minutes in an $N_2$ atmosphere.

46 kg of methylene chloride was added to the obtained reaction solution. The mixture was stirred for 15 minutes, and then separated into a water phase and an organic phase using a centrifugal separator. The thus separated organic phase was mixed with 20 kg of 0.1N hydrochloric acid and then stirred for 15 minutes to extract pyridine and a small amount of residual alkali salts therefrom. Thereafter, the stirring was stopped, and the obtained mixture was allowed to stand, thereby separating the mixture into a water phase and an organic phase. Further, the separated organic phase was mixed with 20 kg of pure water, stirred for 15 minutes, and then separated into a water phase and an organic phase using a centrifugal separator. The above separation procedure was repeated until no chlorine ions were detected in the extraction effluent.

The thus purified polycarbonate solution was powdered using a kneader and then dried, thereby obtaining particles (flakes).

The thus obtained flakes were kneaded at a resin temperature of 290° C. using a 30 $mm^2$-screw extruder (manufactured by Ikegai Tekko Co., Ltd.), and then pelletized. The polymerization conditions and properties of the obtained polycarbonate resins are shown in Table 2.

EXAMPLES 10 to 12 (EXAMPLES REGARDING THE CASES WHERE OH MOLECULAR ENDS WERE MODIFIED WITH CHLOROFORMATE)

The same procedure for the production of polycarbonate resins as defined in respective Examples 6 to 9 was conducted as follows. That is, the stirring-rotation speed was adjusted to those shown in Table 2. After the predetermined amounts of NaOH and pure water were added to the reaction solution, and then the resultant solution was continuously stirred for 60 minutes. Thereafter, 181 g of phenyl chloroformate was added to the solution, and the obtained mixture was further continuously stirred for 30 minutes, thereby obtaining polycarbonate. The thus obtained polycarbonate was treated by the same method as defined in respective Examples 6 to 9. The polymerization conditions and properties of the obtained polycarbonate resins are shown in Table 2.

TABLE 2

| | | Example 6 | Example 7 | Example 8 |
| --- | --- | --- | --- | --- |
| Kind of catalyst used | | Pyridine hydrochloride | Pyridine hydrochloride | Pyridine hydrochloride |
| Kind of end stopping agent used | | — | — | — |
| Amount of catalyst used (mol % based on bisphenol) | | 0.040 | 0.040 | 0.040 |
| Amount of end stopping agent used (mol % based on bisphenol) | | — | — | — |
| Stirring-rotation speed (rpm) | | 220 | 260 | 300 |
| Viscosity-average molecular weight (Mv) | | 8,200 | 11,200 | 16,300 |
| Molecular weight distribution (Mw/Mn from GPC) | | 1.41 | 1.52 | 1.49 |
| Number-average molecular weight (Mn' from number of end groups) | | 6,800 | 9,500 | 14,300 |
| Mv/Mn' (from number of end groups) | | 1.20 | 1.17 | 1.14 |
| Q value (ml/sec) ($\times 10^{-2}$) | | 48.2 | 33.2 | 7.6 |
| Number of OH end groups ($\mu$eq/g) | | 293 | 211 | 140 |
| Amount of sublimation on heating | Amount of DPC sublimated (ppm) | Not detected | Not detected | Not detected |
| | Amount of PB sublimated (ppm) | Not detected | Not detected | Not detected |
| | Amount of PBP sublimated (ppm) | Not detected | Not detected | Not detected |

| | Example 9 | Example 10 |
| --- | --- | --- |
| Kind of catalyst used | Pyridine hydrochloride | Pyridine hydrochloride |
| Kind of end stopping agent used | — | Phenyl chloroformate |
| Amount of catalyst used (mol % based on bisphenol) | 0.040 | 0.040 |
| Amount of end stopping agent used (mol % based on bisphenol) | — | 4.00 |
| Stirring-rotation speed (rpm) | 350 | 300 |
| Viscosity-average molecular weight (Mv) | 75,300 | 16,300 |
| Molecular weight distribution (Mw/Mn from GPC) | 1.27 | 1.49 |
| Number-average molecular weight (Mn' from number of end groups) | 69,400 | 14,300 |
| Mv/Mn' (from number of end groups) | 1.09 | 1.14 |
| Q value (ml/sec) ($\times 10^{-2}$) | Not flowed | 25.8 |
| Number of OH end groups ($\mu$eq/g) | 29 | 12 |
| Amount of | Not detected | 0.3 |

TABLE 2-continued

|  |  | Example 11 | Example 12 |
|---|---|---|---|
| Amount of sublimation on heating | DPC sublimated (ppm) | Not detected | Not detected |
|  | Amount of PB sublimated (ppm) | Not detected | Not detected |
|  | Amount of PBP sublimated (ppm) | Not detected | Not detected |
| Kind of catalyst used |  | Pyridine hydrochloride | Pyridine hydrochloride |
| Kind of end stopping agent used |  | Phenyl chloroformate | Phenyl chloroformate |
| Amount of catalyst used (mol % based on bisphenol) |  | 0.040 | 0.040 |
| Amount of end stopping agent used (mol % based on bisphenol) |  | 4.00 | 4.00 |
| Stirring-rotation speed (rpm) |  | 320 | 350 |
| viscosity-average molecular weight (Mv) |  | 24,800 | 74,900 |
| Molecular weight distribution (Mw/Mn from GPC) |  | 1.48 | 1.28 |
| Number-average molecular weight (Mn' from number of end groups) |  | 22,200 | 69,000 |
| Mv/Mn' (from number of end groups) |  | 1.12 | 1.09 |
| Q value (ml/sec) (× 10$^{-2}$) |  | 3.5 | Not flowed |
| Number of OH end groups (μeq/g) |  | 5 | 4 |
| Amount of sublimation on heating | Amount of DPC sublimated (ppm) | 0.3 | 0.3 |
|  | Amount of PB sublimated (ppm) | Not detected | Not detected |
|  | Amount of PBP sublimated (ppm) | Not detected | Not detected |

The polymer having such a sharp molecular weight distribution cannot be produced as long as the bifunctional monomers have the same reactivity. All polymers produced in such a case are ideal ones according to Flory's theory which merely have a Mw/Mn ratio of 2.0:1.

The reaction mechanism of producing the polymer having such a sharp molecular weight distribution is considered as follows. That is, one molecular end is extremely different in reactivity from the other molecular end, so that there is established such a condition that the reaction proceeds only in one direction, i.e., only from either one of the molecular ends. The condensation reactions for the production of polycarbonate using pyridine as a catalyst as described in the above Examples all satisfy this requirement. Namely, when the low-basic catalyst such as pyridine is used, the chloroformate molecular ends cannot be activated to such a level that they are ionized, so that the reaction entirely proceeds only from the ionized phenylene-ONa molecular ends. Therefore, the obtained polymer can show a molecular weight distribution close to that of monodisperse system. When the counterparts to be reacted are used up, the hydrolysis reaction of the chloroformate molecular ends which have proceeded simultaneously with the above reaction to some extent, now proceeds substantially, so that the chloroformate molecular ends are stopped in the form of OH end groups.

Accordingly, in the case where the interface area per unit volume in the interfacial polycondensation is large, the obtained product becomes a high molecular weight polymer since the amount of monomers supplied is sufficient. On the other hand, when the interface area per unit volume is small, the hydrolysis reaction of the chloroformate molecular ends preferentially proceeds relative to the polycondensation reaction, resulting in limited molecular growth up to a predetermined low molecular weight.

As is apparent from the above Table 2, the molecular weight (Mv) of the obtained polycarbonate becomes higher by increasing the stirring-rotation speed (emulsion interface area) upon the interfacial polycondensation reaction.

What is claimed is:

1. A polycarbonate resin obtained by reacting a carbonate raw material with a dihydroxy compound, having:

a ratio (Mw/Mn) of a weight-average molecular weight (Mw) to a number-average molecular weight (Mn) of not more than 2.2:1, calculated as polystyrene, when measured by gel permeation chromatography; and a ratio (Mv/Mn') of a viscosity-average molecular weight (Mv) calculated according to the following formulae, to a number-average molecular weight (Mn') calculated based on the number of molecular ends, of not more than 1.40:1

$$\eta_{sp}/C=[\eta]\times(1+0.28\eta_{sp})$$

$$[\eta]=1.23\times10^{-4}\times(M_v)^{0.83}$$

wherein $\eta_{sp}$ is a specific viscosity of the polycarbonate resin when measured with respect to a methylene chloride solution thereof at 20° C.; and C is a concentration of the methylene chloride solution, in the present case, the methylene chloride solution having a polycarbonate resin concentration of 0.6 g/dl is used.

2. A polycarbonate resin according to claim 1, wherein the Mw/Mn ratio is not more than 2.0:1, and the Mv/Mn' ratio is not more than 1.30:1.

3. A polycarbonate resin according to claim 1, wherein the Mw/Mn ratio is not more than 1.8:1, and the Mv/Mn' ratio is not more than 1.20:1.

4. A polycarbonate resin according to any one of claims 1 to 3, wherein the viscosity-average molecular weight (Mv) is in the range of 8,000 to 100,000.

5. A polycarbonate resin according to any one of claims 1 to 4, which is produced by a process comprising:

reacting an aromatic compound having two phenolic hydroxyl groups with phosgene in the presence of an organic solvent to obtain an organic solvent solution of polycarbonate; and subjecting said organic solvent solution to evaporation to remove the organic solvent therefrom.

* * * * *